United States Patent [19]

Assante et al.

[11] Patent Number: 5,739,261

[45] Date of Patent: Apr. 14, 1998

[54] PREPARATION OF OXYSULFONYLATED POLYESTERS

[75] Inventors: Jean-Pierre Assante, Villeurbanne; Etienne Fleury, Irigny; Didier Veyrat, St-Cyr-Au-Mont-D'Or, all of France

[73] Assignee: Rhone-Poulenc Films, Courbevoie Cedex, France

[21] Appl. No.: 462,552

[22] Filed: Jun. 5, 1995

Related U.S. Application Data

[63] Continuation of Ser. No. 34,408, Mar. 18, 1993, abandoned.

[30] Foreign Application Priority Data

Mar. 18, 1992 [FR] France ............... 92 03480

[51] Int. Cl.$^6$ ............... C08G 63/82; C08K 3/32
[52] U.S. Cl. ............... 528/277; 528/272; 528/275; 528/277; 528/279; 528/286; 528/295; 528/301; 528/302; 528/307; 528/308; 528/308.6; 524/706; 524/710; 524/779; 524/783
[58] Field of Search ............... 528/272, 275, 528/277, 279, 286, 295, 301, 302, 307, 308, 308.6; 524/706, 710, 779, 783

[56] References Cited

U.S. PATENT DOCUMENTS

| | | | |
|---|---|---|---|
| 3,962,189 | 6/1976 | Russin et al. | 528/277 |
| 4,377,682 | 3/1983 | Ohguchi et al. | 528/301 |
| 4,499,262 | 2/1985 | Fagerburg et al. | 528/279 |
| 4,820,795 | 4/1989 | Hirata et al. | 528/272 |
| 4,978,740 | 12/1990 | Kawamoto et al. | 528/272 |
| 5,171,308 | 12/1992 | Gallagher et al. | 604/372 |
| 5,191,097 | 3/1993 | Niki et al. | 528/190 |

FOREIGN PATENT DOCUMENTS

| | | |
|---|---|---|
| 0129674 A1 | 1/1985 | European Pat. Off. |
| 2628359 A1 | 9/1989 | France . |
| 2705230 | 8/1978 | Germany . |

OTHER PUBLICATIONS

Patent Abstracts of Japan, vol. 10, No. 383 (C–393)(2440) Dec. 23, 1986, & JP-A-61 174 223.

*Primary Examiner*—Samuel A. Acquah
*Attorney, Agent, or Firm*—Burns, Doane, Swecker & Mathis, L.L.P.

[57] ABSTRACT

Oxysulfonylated polyesters, well suited for conversion into oriented composite polyester films, are prepared by polycondensing a lower alkyl diester of at least one aliphatic dicarboxylic acid and a lower alkyl diester of at least one aromatic dicarboxylic acid bearing an oxysulfonyl substituent, and optionally a lower alkyl diester of at least one aromatic dicarboxylic acid, with at least one diol, in the presence of a catalytically effective amount of at least one titanium compound and at least one manganese carboxylate.

20 Claims, No Drawings

PREPARATION OF OXYSULFONYLATED POLYESTERS

This application is a continuation of application Ser. No. 08/034,408, filed Mar. 18, 1993, now abandoned.

BACKGROUND OF THE INVENTION

1. Field of the Invention

The present invention relates to an improved process for the preparation of polyesters containing oxysulfonyl functional groups.

2. Description of the Prior Art

It is known to this art to employ oriented composite polyester films for certain applications in which single oriented polyester films are unsuitable.

These composite polyester films constitute, in particular, biaxially oriented polyethylene terephthalate films comprising on one of the face surfaces or on both face surfaces thereof, a coating layer which is adapted to each type of application.

Thus, U.S. Pat. Nos. 3,563,942 and 3,779,993 describe water-soluble or water-dispersible copolyesters which, when applied as adhesion promoting layers, improve the adhesiveness of photosensitive layers to polyethylene terephthalate film substrates.

EP-A-0,129,674 describes coating layers of copolyesters containing particular oxysulfonyl groups to provide composite polyester films having improved adhesiveness.

FR-A-2,628,359 describes the preparation of oriented composite polyester films having improved adhesiveness, by simultaneous extrusion of a crystallizable polyester such as polyethylene terephthalate and of a copolyester containing an oxysulfonyl group, comprising recurring structural units originating from aromatic and aliphatic dicarboxylic acids, from an aromatic dicarboxylic acid containing an oxysulfonyl group and from glycols.

And EP-A-0,129,674 describes the preparation of copolyesters containing oxysulfonyl groups by reacting esters of various carboxylic acids with glycol at a temperature ranging up to 290° C. in the presence of a catalytically effective amount of manganese acetate and antimony trioxide.

At this temperature, polycondensation is carried out, but a loss of structural units deriving from the aliphatic diacid is observed. This phenomenon has also been described in the *Journal of the Chemical Society*, pages 2633 to 2637 (1952).

If the operation is carried out at a lower temperature, the polycondensation kinetics present a problem and the formation of copolyesters having excessively low molecular weights is observed.

Copolyesters containing oxysulfonyl groups can also be prepared by employing a titanium alkoxide as the catalyst. The polycondensation is rapid, but the polymer becomes pink or red in color; this can be awkward for certain applications. In addition, the copolyester thus prepared tends to degrade.

SUMMARY OF THE INVENTION

Accordingly, a major object of the present invention is the provision of an improved process for the preparation of copolyesters containing oxysulfonyl groups under conditions such that the polycondensation reaction suffices to attain the desired molecular weights without, however, concomitant considerable loss of structural units derived from the aliphatic diacid and without the development of undesirable coloration.

Briefly, the present invention features a process for the preparation of an oxysulfonylated copolyester including a plurality of recurring structural units derived from at least one aliphatic dicarboxylic acid, from at least one aromatic dicarboxylic acid containing an oxysulfonyl functional group, optionally from at least one aromatic dicarboxylic acid, and from at least one diol, comprising polycondensing the lower alkyl diesters of the aforesaid diacids with said diol in the presence of a catalytically effective amount of at least one titanium compound and at least one manganese carboxylate.

DETAILED DESCRIPTION OF PREFERRED EMBODIMENTS OF THE INVENTION

More particularly according to the present invention, the organic titanium compounds are preferably thus employed, notably the titanium alkoxides derived from alkanols having from 1 to 6 carbon atoms or from alkanolamines having from 2 to 12 carbon atoms and more preferably from alkanols having from 2 to 4 carbon atoms or from alkanolamines having from 4 to 9 carbon atoms.

Exemplary such organic titanium compounds include tetrabutyl titanate and 2,2',2"-nitrilotriethyl titanate (or titanium aminotriethanolate).

The manganese carboxylates are advantageously aliphatic carboxylates preferably having from 1 to 6 carbon atoms.

That most commonly employed such compound is manganese acetate.

The amount of the titanium compound is expressed as weight of titanium relative to the total weight of the diacids and diol introduced.

This amount typically ranges from 0.0002% to 0.0030% of titanium.

This quantity preferably ranges from 0.0005% to 0.0025% of titanium.

The amount of manganese carboxylate is expressed as weight of manganese relative to the total weight of the diacids and diols introduced.

This quantity generally ranges from 0.0020% to 0.0100% of manganese and preferably from 0.0030% to 0.0060%.

Other compounds may advantageously be used in combination with these catalysts employed in the process of the invention.

Thus, it is advantageous to carry out the process in the presence of a sodium carboxylate, preferably sodium acetate, which makes it possible to reduce the formation of diethylene glycol structural units in the final copolyester, as this is desirable for certain applications of the oxysulfonylated copolyesters.

The sodium carboxylate, expressed as weight of sodium relative to the total weight of the diacids and diol introduced, advantageously ranges from 0% to 0.0500% and preferably from 0.0050% to 0.0200%.

The temperature at which the process is conducted must permit a sufficiently rapid reaction without, however, promoting degradation or a considerable loss of certain structural units from the copolyester.

Taking account of these essential requirements and when employing suitable amounts of catalysts within the ranges of values indicated above, the temperature at which the reaction is carried out advantageously ranges from 200° C. to 280° C. and preferably from 220° C. to 260° C.

The reaction time varies essentially according to the amount of the catalysts, the temperature and the other parameters which are conventional in a reaction of this type.

For example, it can range from a few hours to approximately 24 hours. It typically ranges from 5 hours to 10 hours, these values not being critical in nature.

The aromatic diacids which can be employed in the process of the invention characteristically have the general formula (I):

HOOC—Ar—COOH (I)

in which Ar is a phenylene radical optionally bearing one or more substituents such as an alkyl radical having from 1 to 4 carbon atoms; a halogen atom or an OH radical, or a combination of a plurality of ortho- or pericondensed phenyl radicals or of a plurality of phenyl radicals bonded together via inert bridging groups such as a single valence bond, an alkylene radical, an ether group, a ketone group or a sulfone group.

Exemplary such aromatic diacids include isophthalic acid, terephthalic acid, orthophthalic acid, 1,2-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid.

The aromatic diacid typically employed is terephthalic acid.

The aromatic diacids are introduced in the form of their lower alkyl esters, namely, the alkyl moiety having from 1 to 4 carbon atoms, and preferably of the dimethyl esters thereof.

The aromatic diacids containing an oxysulfonyl group which are employed in the subject process characteristically have the general formula (II):

in which M is a hydrogen, sodium, lithium or potassium atom, and Q is a phenylene radical or a combination of a plurality of ortho- or pericondensed phenyl radicals or of a plurality of phenyl radicals bonded together via inert bridging groups such as a single valence bond, an alkylene radical, an ether group, a ketone group or a sulfone group.

Exemplary such dicarboxylic acids containing oxysulfonyl groups include hydroxysulfonylterephthalic and hydroxysulfonylisophthalic acids (in particular-5-sulfoisophthalic acid), hydroxysulfonyl-ortho-phthalic, 4-hydroxysulfonyl-2,7-naphthalenedicarboxylic and hydroxysulfonyldiphenyl-4,4'-dicarboxylic acids, hydroxysulfonyl-4,4'-dihydroxycarbonyldiphenylsulfones, hydroxysulfonyl-4,4'-dihydroxycarbonyldiphenylmethanes, 5-(hydroxysulfonylphenoxy) isophthalic acid and 5-(hydroxysulfonylpropoxy) isophthalic acid.

5-Sulfoisophthalic acid is particularly preferred.

The aromatic diacids containing an oxysulfonyl group are also introduced in the form of the lower alkyl esters thereof and the dimethyl esters thereof are preferably employed.

The sulfonic acid group is preferably in the form of an alkali metal salt and more particularly the sodium salt.

The aliphatic diacids employed in the process of the present invention are more particularly the saturated dicarboxylic acids having from 3 to 12 carbon atoms.

Exemplary such aliphatic diacids include adipic, succinic, sebacic, azelaic, glutaric and suberic acids. These acids are introduced in the form of their lower alkyl esters and preferably of their dimethyl esters. It is also within the scope of this invention to combine a number of different aliphatic diacids in order to prepare the copolyesters containing oxysulfonyl groups.

Adipic acid is the preferred aliphatic diacid in the process of the invention.

The diols which are used in the present process are those typically employed for the preparation of polyesters. Preferably, saturated aliphatic diols having from 2 to 4 carbon atoms are used, such as ethylene glycol, propylene glycol or 1,4-butanediol. These diols can be employed either alone or mixed with each other or with diols having a higher number of carbon atoms, such as 2,2-dimethyl-1,3-propanediol, 1,6-hexanediol or cyclohexanedimethanol. In this latter event, the amount of diol having a carbon content greater than or equal to 5 is selected such as not to increase the crystallizability of the copolyester under the influence of solvents; this amount depends on the number of carbons and on the structure of the diol in question.

Similarly, in the event of conversion of these copolyesters containing oxysulfonyl groups into oriented composite films having improved adhesiveness, such as those described in FR-A-2,628,359, it is preferable to avoid or to limit in the sulfonated copolyester structure the presence of recurring structural units derived from polyoxyalkylene glycols such as diethylene glycol, triethylene glycol, pentaethylene glycol and decaethylene glycol. Thus, the amount by weight of polyoxyalkylene glycol in the copolyester is then preferably less than or equal to 6% and still more preferably to 5%.

In the subject process for the preparation of copolyesters containing oxysulfonyl groups, ethylene glycol is preferably employed which, if appropriate, can be combined with a minor amount of at least one of the aforementioned diols.

The molar proportions of the different reactants employed in the process of the invention are generally within the following ranges of values.

The lower alkyl diester(s) of the aromatic diacids generally constitute from 0% to 95 mol % relative to the total amount of the diesters introduced, and preferably from 65% to 93 mol %.

The lower alkyl diester(s) of the aliphatic diacids generally constitute from 4% to 99 mol % relative to the total amount of the diesters introduced, and preferably from 5% to 25 mol %.

The lower alkyl diester(s) of the aromatic diacids containing oxysulfonyl groups generally constitute from 1% to 30 mol % relative to the total amount of the diesters introduced, and preferably from 2% to 10 mol %.

The diols/diesters molar ratio advantageously ranges from 1.5 to 2.5 and preferably from 1.8 to 2.1.

The sulfonated copolyesters obtained by the process of the invention can be employed, in particular, for preparing composite films by coextrusion. This indicates that they have an excellent thermal and thermooxidative stability.

The catalyst system employed makes it possible to provide such a thermal stability; however, it sometimes proves necessary to improve the thermooxidative stability.

This improvement can be attained by the inclusion of a phenolic antioxidant during the preparation of the copolyester. Phenolic antioxidants are widely known polymer adjuvants. Exemplary thereof are the alkylated monophenols, alkylated hydroquinones, hydroxylated diphenyl sulfides, alkylidenebisphenols, benzyl derivatives, acylaminophenols, esters of 3-(3,5-di-tert-butyl-4-hydroxyphenyl)propionic acid, esters of 3-(5-tert-butyl-4-hydroxy-3-methylphenyl)propionic acid, esters of 3-(3,5-dicyclohexyl-4-hydroxyphenyl)propionic acid and amides of 3-(3,5-di-tert-butyl-4-hydroxyphenyl)propionic acid.

And exemplary of the very commonly used commercial antioxidants which can thus be employed in the process of the invention are pentaerythrityl tetrakis-3-(4-hydroxy-3,5-di-tert-butylphenyl)propionate (marketed under the trademark Irganox 1010), diethyl (4-hydroxy-3,5-di-tert-butylbenzyl)phosphonate (marketed under the trademark Irganox 1222) and 4'-hydroxy-4-hydroxy-3,5-di-tert-butyldiphenylmethane (marketed under the trademark Irganox 1330).

In order to further illustrate the present invention and the advantages thereof, the following specific examples are given, it being understood that same are intended only as illustrative and in nowise limitative.

EXAMPLES 1 TO 4 AND COMPARATIVE TESTS 1 AND 2

The following materials were introduced cold into a 7.5-1 stainless steel reactor fitted with an anchor stirrer, a jacket for circulating a heat-transfer liquid and a distillation column controlled by a solenoid valve:

(i) 2,861 g (14.733 mol) of dimethyl terephthalate;

(ii) 287 g (1.703 mol) of dimethyl adipate;

(iii) 177 g (0.596 mol) of dimethyl isophthalate sodium 5-sulfonate;

(iv) 2,112 g (34.064 mol) of ethylene glycol;

(v) catalysts: the amounts of the different catalysts (expressed as % weight/weight of Ti, Mn, Na, Sb metal relative to the total reactants) are reported in the Table below; the catalysts employed were:

(a) titanium aminotriethanolate,
(b) manganese acetate,
(c) sodium acetate,
(d) antimony trioxide;

(vi) phosphoric acid: expressed as % weight/weight of phosphorus relative to the total reactants;

(vii) phenolic antioxidant Irganox 1330: as % weight/weight relative to the total reactants (introduced when the temperatures reached a value of 240° C.).

Stirring was initiated and the contents of the reactor were heated rapidly to 180° C., at which temperature methanol began to distil. The temperature in the reaction mixture was increased to 220° C. over approximately 2 hours, 30 min. The excess ethylene glycol was distilled between 220° C. and 240° C. If appropriate, the phenolic antioxidant was added at 240° C.

The reaction mixture was then transferred to an autoclave heated to 250° C. The pressure in the autoclave was reduced to approximately 70 Pa. The polycondensation was continued during the time period reported in the Table. The pressure in the autoclave was then returned to atmospheric pressure by introducing nitrogen, and the molten copolyester was then drained under a casting wheel and was granulated.

The copolyester obtained was subjected to the following determinations:

(1) observation of its color;

(2) measurement of its viscosity index (VI) in solution at a concentration of 1% by weight in orthochlorophenol at 25° C.;

(3) determination of the diethylene glycol (DEG) recurring units by gas chromatography after saponification of the copolyester: in % weight/weight relative to the total of the glycol units;

(4) measurement of the number-average molecular weight ($\overline{Mn}$) measured at 80° C. in N-methylpyrrolidone;

(5) measurement of the apparent viscosity at 280° C. at time 0 and after 30 min: measurement performed by capillary rheometry (Instron 3211 apparatus fitted with a 50/1 mm die); the percentage decrease in this viscosity is reported in the Table.

The characteristics of the different tests carried out are reported in the following Table:

TABLE

| TESTS | EXAMPLE 1 | EXAMPLE 2 | EXAMPLE 3 | EXAMPLE 4 | COMPARATIVE TEST 1 | COMPARATIVE TEST 2 |
|---|---|---|---|---|---|---|
| Ti % | 0.0010 | 0.0020 | 0.0022 | 0.0020 | 0.0054 | 0.0054 |
| Mn % | 0.0054 | 0.0054 | 0.0054 | 0.0054 | 0 | 0 |
| Sb % | 0 | 0 | 0 | 0 | 0.0050 | 0.0365 |
| Na % | 0.0100 | 0.0050 | 0.0100 | 0.0100 | 0.0100 | 0 |
| P % | 0.0037 | 0.0037 | 0.0037 | 0.0037 | 0 | 0 |
| Irganox 1330 | 0 | 0.2000 | 0.2000 | 0.2000 | 0 | 0.2000 |
| POLYCONDENSATION PERIOD AT 250° C. | 1 h, 20 min (at 260° C.) | 1 h, 40 min | 1 h, 20 min | 1 hr, 20 min | 1 hr, 10 min | 1 hr 10 min |
| COLOR | White | White | White | White | Red | Red |
| V.I. | 58.0 | 60.9 | 55.0 | 54.3 | 49.0 | 54.5 |
| $\overline{Mn}$ | 25,200 | 27,400 | 24,700 | 24,500 | 20,700 | 24,000 |
| DEG % | 2.5 | 5.7 | 3.2 | 3.7 | 3.5 | 4.0 |
| % decrease in viscosity at 280° C. | 28 | 25 | 25 | 25 | 50 | 50 |

Furthermore, Examples 2 and 4, carried out in the presence of a phenolic antioxidant, indicate a higher resistance to thermooxidation than identical tests carried out in the absence of phenolic antioxidant.

The degree of thermooxidative stability was assessed by differential thermal scanning calorimetry (Perkin Elmer DSC 7 apparatus) by the following technique:

10 mg of copolyester powder to be analyzed were introduced into a capsule and the following temperature cycle was applied:

(i) under nitrogen (20 cm³/min): heat to 260° C. at 10° C./min, hold at 260° C. for 3 min, quench at 200° C./min to 20° C.;

(ii) under air (40 cm³/min): heat to 320° C. at 10° C./min.

In copolyesters prepared in an identical manner, the color of the granules obtained at the end of the polymerization was the same (white) with or without the phenolic antioxidant.

On the other hand, after single-screw extrusion at 280° C. and regranulation of the copolyesters, it was seen that the copolyester containing the antioxidant remained white, whereas that not containing the antioxidant had become yellow/brown.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an oxysulfonylated polyester, comprising polycondensing a lower alkyl diester of at least one aliphatic dicarboxylic acid and a lower alkyl diester of at least one aromatic dicarboxylic acid bearing an oxysulfonyl substituent, with at least one diol, in the presence of a catalytically effective amount of at least one titanium alkoxide compound and at least one manganese carboxylate, and in the absence of antimony compounds, wherein said at least one titanium alkoxide compound is present in an amount effective to produce an oxysulfonylated polyester free of a pink or red coloration.

2. The process as defined by claim 1, said titanium alkoxide compound comprising a derivative of an alkanol having from 1 to 6 carbon atoms or of an alkanolamine having from 2 to 12 carbon atoms.

3. The process as defined by claim 2, said alkanol having from 2 to 4 carbon atoms and said alkanolamine having from 4 to 9 carbon atoms.

4. The process as defined by claim 1, said at least one manganese carboxylate comprising an aliphatic carboxylate having from 1 to 6 carbon atoms.

5. The process as defined by claim 1, wherein the amount of said at least one titanium alkoxide compound, expressed as weight of titanium relative to the total weight of the diacids and diol introduced, ranges from 0.0002% to 0.0030% of titanium.

6. The process as defined by claim 1, wherein the amount of said at least one manganese carboxylate, expressed as weight of manganese relative to the total weight of the diacids and diols introduced, ranges from 0.0020% to 0.0100% of manganese.

7. The process as defined by claim 1, wherein said polycondensing step is carried out in the presence of a sodium carboxylate.

8. The process as defined by claim 1, carried out at a temperature ranging from 200° C. to 280° C.

9. The process as defined by claim 1, wherein said polycondensing step further includes polycondensing a lower alkyl diester of at least one aromatic dicarboxylic acid free of oxysulfonyl substituents.

10. The process as defined by claim 9, said aromatic diesters being of an aromatic dicarboxylic acid having the formula (I):

HOOC—Ar—COOH in which Ar is a phenylene radical optionally bearing one or more alkyl radical substituents having from 1 to 4 carbon atoms, halogen atoms or OH radicals, or a combination of a plurality of ortho- or pericondensed phenyl radicals or of a plurality of phenyl radicals bonded together via an inert bridging group.

11. The process as defined by claim 1, said oxysulfonylated aromatic diesters being of an oxysulfonylated aromatic dicarboxylic acid having the formula (II):

in which M is a hydrogen, sodium, lithium or potassium atom, and Q is a phenylene radical or a combination of a plurality of ortho- or pericondensed phenyl radicals or of a plurality of phenyl radicals bonded together via an inert bridging group.

12. The process as defined by claim 11, said oxysulfonylated aromatic dicarboxylic acid comprising 5-sulfoisophthalic acid or alkali metal salt thereof.

13. The process as defined by claim 1, said aliphatic diesters being of a saturated aliphatic dicarboxylic acid having from 3 to 12 carbon atoms.

14. The process as defined by claim 10, said aliphatic diacid comprising adipic, succinic, sebacic, azelaic, glutaric or suberic acid.

15. The process as defined by claim 1, each of said diesters comprising dimethyl diesters.

16. The process as defined by claim 1, said at least one diol comprising a saturated aliphatic diol having from 2 to 4 carbon atoms.

17. The process as defined by claim 1, wherein the lower alkyl diester(s) of the aromatic diacids constitute from 0 to 95 mol % relative to the total of the diesters introduced, the lower alkyl diester(s) of the aliphatic diacids constitute from 4 to 99 mol % relative to the total of the diesters introduced, and the lower alkyl diester(s) of the oxysulfonylated aromatic diacids constitute from 1 to 30 mol % relative to the total of the diesters introduced.

18. The process as defined by claim 1, wherein the diols/diesters molar ratio ranges from 1.5 to 2.5.

19. The process as defined by claim 1, wherein said polycondensing occurs such that the oxysulfonated polyester attained has a number average molecular weight of at least 24,500 and is free of an undesirable pink or red coloration.

20. A process for the preparation of an oxysulfonylated polyester, comprising polycondensing a lower alkyl diester of at least one aliphatic dicarboxylic acid and a lower alkyl diester of at least one aromatic dicarboxylic acid bearing an oxysulfonyl substituent, with at least one diol, in the presence of a catalyst consisting essentially of a titanium alkoxide compound, a manganese carboxylate, and optionally a sodium carboxylate; wherein said titanium alkoxide compound is present in an amount effective to produce an oxysulfonylated polyester free of a pink or red coloration.

* * * * *